April 15, 1958     J. L. POPHAM     2,830,948

WELL WORKING COMPOSITION

Filed Jan. 30, 1956     2 Sheets-Sheet 1

INVENTOR.
J. L. POPHAM
BY Jerry J. Dunlap
ATTORNEY

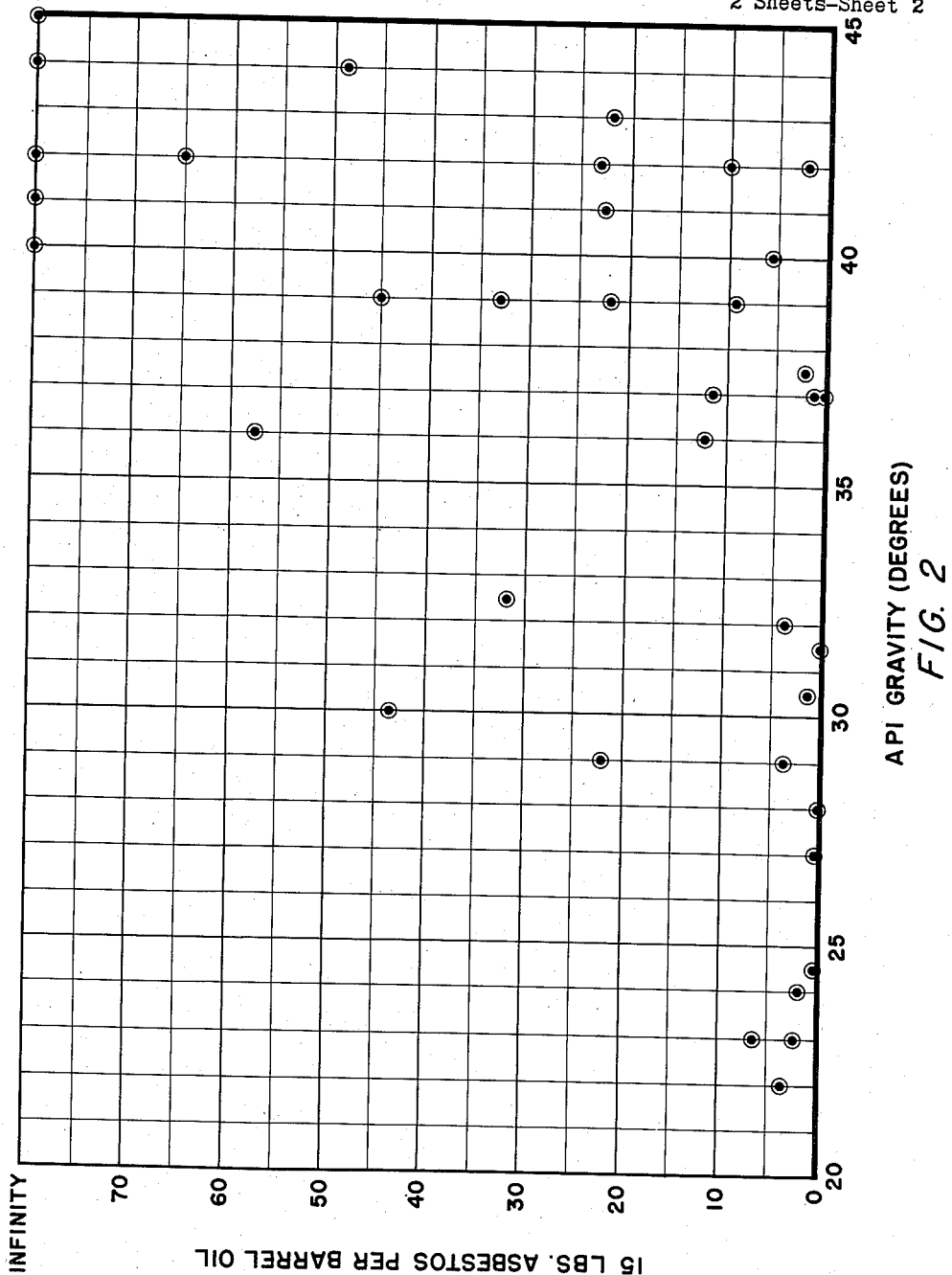

United States Patent Office

2,830,948
Patented Apr. 15, 1958

2,830,948
WELL WORKING COMPOSITION

Jack L. Popham, Ponca City, Okla., assignor to Continental Oil Company, Ponca City, Okla., a corporation of Delaware Application January 30, 1956, Serial No. 562,224

7 Claims. (Cl. 252—8.5)

This invention relates to improvements in well working fluids such as those used in drilling and fracturing oil and gas wells, and more particularly, but not by way of limitation, to an improved oil base drilling mud.

In drilling oil and gas wells by the rotary method, a fluid (usually called drilling mud) is circulated down through the drill string and returned to the surface through the annulus between the drill string and the well bore being formed. The drilling mud performs various functions, such as removing cuttings from the well which are formed by the drill bit; building a sheath on the walls of the bore to minimize loss of mud to the various formations traversed by the bore, and retaining sufficient pressure on walls of the well bore to prevent caving of the formations into the bore and/or prevent migration of undesirable formation fluids into the well bore. To be most effective in performing these various functions, the drill mud should have a viscosity between 200–1000 as measured by a Brookfield viscosimeter at 6 R. P. M. and room temperature (for efficiently removing cuttings); an A. P. I. fluid loss of 10 cc. or less at room temperature (to build a sheath and prevent loss of mud to the formations), and sufficient density at the lower drilling depths, such as 10.5 pounds per gallon, to maintain the desired pressure on the formations.

In an ordinary drilling operation probably the most important problem is to maintain the desired fluid loss characteristics in an economical manner. The usual oil base drilling mud utilizes a combination of expensive materials or compounds to control the fluid loss, thereby making the overall cost of the mud uneconomical for many drilling operations. Common low fluid loss materials include blown asphalt and rubber with a stabilizing agent, such as an alkali metal soap, to prevent sedimentation of the primary material. The soap, or frequently an additional gelling agent, is used to increase the viscosity of the mud.

The present invention contemplates a novel oil base drilling mud using only petroleum oil and asbestos, with a weighting material to increase the density of the mud when desired. Although asbestos has been previously used in drilling muds, it has ordinarily been used in long fibers (such as 2–6 cm.) as a lost circulation material when mud circulation is being lost to an extremely porous formation. Also, the asbestos heretofore employed has been invariably used in combination with other lost circulation or fluid loss materials and stabilizing agents. I have unexpectedly found that when only asbestos, and particularly finely ground asbestos, is suspended in specific types or classes of petroleum oils, a satisfactory drilling fluid is obtained which possesses the desired low fluid loss and viscosity characteristics.

For the purpose of this specification and the appended claims, "lost circulation material" may be defined as a material used for plugging extremely porous formations which are infrequently encountered in drilling operations. When such formations are drilled, a major portion of the drilling mud is frequently lost to the formation before it can be effectively stopped. A "low fluid loss material" is a material used for minimizing leakage of drilling mud into the commonly encountered formations which have relatively small pores.

An important object of this invention is to provide an economical oil base drilling mud.

Another object of this invention is to facilitate well working operations.

A further object of this invention is to provide a low-fluid loss well-working fluid which is simple to prepare or compound.

Another object of this invention is to provide a simple control for the viscosity of oil base well-working fluids.

A still further object of this invention is to eliminate the use of chemicals in oil base drilling muds.

Other objects and advantages of the invention will be evident from the following detailed description, when read in conjunction with the accompanying drawings, which illustrate my invention.

In the drawings:

Figure 2 is a graphical plot of the fluid loss properties of the same compositions plotted in Figure 1 versus the gravity of the oils used.

Figure 1:
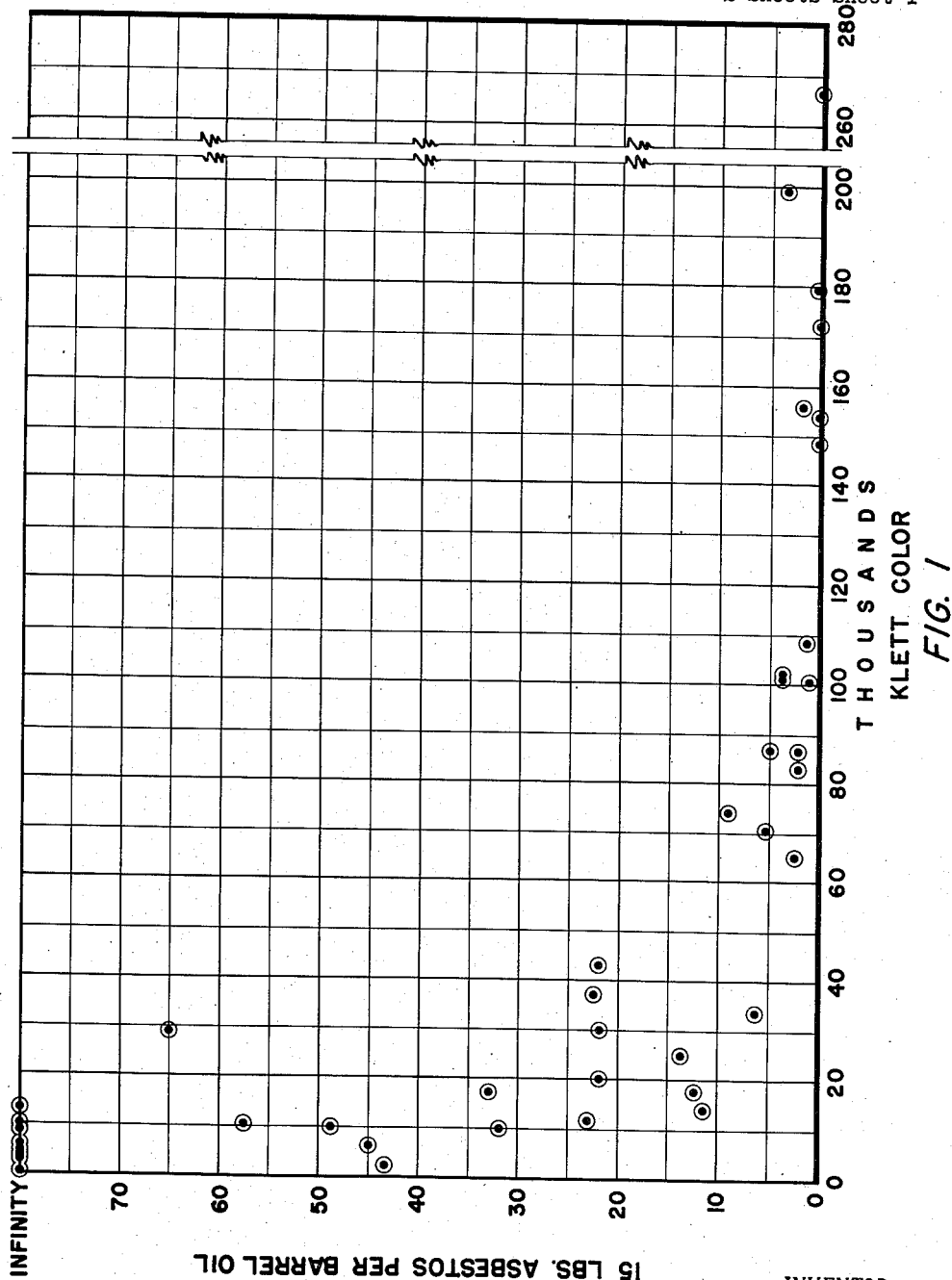
Figure 1 is a graphical plot of the fluid loss properties of several oil-asbestos compositions versus the color of the oil used in making the compositions.

Broadly stated, the present invention may be defined as a well working composition comprising a petroleum oil and asbestos suspended in the petroleum oil, said composition being characterized by having an A. P. I. fluid loss less than 10 cc. per 30 minutes.

PETROLEUM OIL

Perhaps the primary consideration in preparing a well working composition in accordance with this invention is the selection of the oil. Any petroleum oil, either refined or crude, may be used, providing it meets certain qualifications. One consideration in the selection of the oil is by its Klett color as illustrated in Fig. 1. "Klett color" means the number obtained by testing the oil in a standard Klett-Summerson Colorimeter, clinical model (test tube type of instrument) using a No. 66 red filter. Before testing, each oil sample is filtered through No. 2 Whatman filter paper, and the colorimeter is zeroed using distilled water. The color testing is then carried out as described in the operating manual for the instrument. "A. P. I. fluid loss" means the fluid loss obtained by subjecting a composition to the standard field procedure for testing drilling fluids, section V, A. P. I. test RP29, May 1950.

The graph of Fig. 1 was obtained by first testing each of some 41 randomly selected crude oil samples for their Klett color; incorporating an equivalent of 15 pounds of finely ground asbestos (Johns-Manville asbestos classification 7RF1) per barrel of oil in each sample, and then testing the asbestos/oil compositions for A. P. I. fluid loss. The selection of 15 pounds of asbestos per barrel of oil was based on expediency only, since much smaller amounts of asbestos will give comparable fluid loss results as will more fully hereinafter appear. From Fig. 1 it will be observed that, generally speaking, the fluid loss of the final composition decreases as the Klett color reading of the oil increases. For a satisfactory fluid loss of 10 cc., the oil should have a Klett color reading of more than 50,000 and preferably more than 60,000.

Although I do not wish to be limited to any theory of operation, it is believed that when a composition of this invention is placed in contact with a formation, a small amount of the oil is forced into the pores of the formation. As a result, a portion of the asbestos is deposited on the surface of the formation, with perhaps a minor portion of the deposited asbestos being carried into the outermost pores of the formation, to form what may be considered a pervious mat of asbestos on the formation. Some component of the oil (which is believed to be high molecular weight polymerized molecules) precipitates on and around the deposited asbestos to provide a substantially impervious sheath.

In any event, I have found that when the oil used has a Klett color of at least 50 or 60 thousand, the oil combined with asbestos will give good fluid loss control. It first tested for viscosity with a Brookfield viscosimeter at 6 R. P. M. and room temperature, as well as for A. P. I. fluid loss. Each crude was then mixed with 0.5 pound of asbestos per barrel of crude and stirred for 5 minutes; whereupon the viscosity and A. P. I. fluid loss were again taken. This procedure was repeated for each amount of asbestos shown. The 4Z20 asbestos is also a Johns-Manville Canadian classification and contains a large proportion of fibers somewhat longer than the previously described 7RF1.

*Table I*

(J. R. LANSING CRUDE)

| #/Bbl. Asbestos | 0 | 0.5 | 0.5 | 5 | 5 | 10 | 10 | 15 | 15 |
|---|---|---|---|---|---|---|---|---|---|
| Type Asbestos | | 7RF1 | 4Z20 | 7RF1 | 4Z20 | 7RF1 | 4Z20 | 7RF1 | 4Z20 |
| A. P. I. fluid loss | >100 | 5.4 | 9.4 | 2.2 | 2.6 | 1.4 | 1.8 | 1.2 | 5.0 |
| Viscosity | 10 | 25 | 50 | 125 | 370 | 400 | 3,560 | 760 | 8,250 |

*Table II*

(A. GROTH CRUDE)

| #/Bbl. Asbestos | 0 | 0.5 | 0.5 | 5 | 5 | 10 | 10 | 15 | 15 |
|---|---|---|---|---|---|---|---|---|---|
| Type Asbestos | | 7RF1 | 4Z20 | 7RF1 | 4Z20 | 7RF1 | 4Z20 | 7RF1 | 4Z20 |
| A. P. I. fluid loss | >100 | 5.4 | 14 | 5.4 | 6.0 | 6.4 | 2.2 | 7.0 | 1.0 |
| Viscosity | 8 | 25 | 50 | 140 | 880 | 475 | 4,160 | 800 | 10,400 |

*Table III*

(J. MATTSON CRUDE)

| #/Bbl. Asbestos | 0 | 0.5 | 0.5 | 5 | 5 | 10 | 10 | 15 | 15 |
|---|---|---|---|---|---|---|---|---|---|
| Type Asbestos | | 7RF1 | 4Z20 | 7RF1 | 4Z20 | 7RF1 | 4Z20 | 7RF1 | 4Z20 |
| A. P. I. fluid loss | >100 | 7.0 | 8.5 | 1.0 | 2.4 | 0.8 | 6.6 | 1.0 | 1.0 |
| Viscosity | 7 | 25 | 50 | 125 | 675 | 450 | 3,550 | 740 | 9,550 | will be understood, of course, that the color characteristic is intrinsic to the oil and is not one induced by the addition of dye or the like.

Fig. 2 was obtained in substantially the same manner as Fig. 1, except that the gravity of each oil sample was obtained, rather than the Klett color reading. As will be apparent, oils having an A. P. I. gravity of 29 degrees or above exhibit erratic fluid loss characteristics when combined with asbestos, in that two oils having the same gravity may have drastically different fluid loss properties when combined with asbestos. However, all of the oils having an A. P. I. gravity below 29 degrees exhibit good fluid loss characteristics (that is, below 10 cc.), and the majority of these oils have an exceptionally good fluid loss of less than 5 cc. Therefore, when it is desired, or necessary, to select an oil for use in the composition of this invention by gravity alone, the oil should have an A. P. I. gravity below 29 degrees, and preferably below 25 degrees.

ASBESTOS

The preferred asbestos of this invention is a finely ground asbestos with substantially 75 percent of the fibers being less than 2 microns in length, and preferably having a portion of the fibers (such as 40 percent) less than 0.5 micron in length. A presently obtainable and satisfactory asbestos is Johns-Manville class 7RF1 (Canadian classification). Longer fibered asbestos may also be used, but is less efficient for use in a drilling mud, since the longer fibers will not pass through the usual shale shaker employed in drilling operations. The preferred asbestos readily passes through a shale shaker having a 16 mesh screen. Also, the longer fiber asbestos is more expensive.

The amount of asbestos used will vary over a wide range, depending principally on the final viscosity desired. Generally speaking, from 0.5 to 2 pounds of asbestos per barrel of oil is sufficient to provide a satisfactory fluid loss, and the amount of asbestos may be increased as needed to obtain the desired final viscosity.

In each of the following examples the crude was selected as having either a Klett color reading of more than 60,000 or an A. P. I. gravity below 25. Each crude was It will be observed in each of Tables I, II, and III that the viscosity of the composition increases with increased amounts of asbestos, with the longer asbestos giving higher viscosities. Similar results have been obtained with various other oil samples. However, the viscosity varies with the oil being used, as well as with the type of asbestos, and, in some instances, 25 pounds of asbestos per barrel of oil may be required to obtain the desired viscosity, particularly when a finely ground asbestos is used.

From the foregoing it is apparent that an oil base well working composition may be made using only asbestos and a petroleum oil having specific characteristics. The well working composition of this invention is characterized by having a low fluid loss and a viscosity of substantially any desired quantity. The present invention contemplates a substantial economy in well working operations, and particularly in drilling operations. The use of chemicals for stabilizing or controlling the fluid loss and viscosity of drill muds is eliminated. When the composition of the present invention is used as a drilling mud, any desired weighting materials such as Bayrites, calcium carbonate, lead oxide or Hematite may be suspended in the mud to obtain the necessary density.

The foregoing examples are intended to be exemplary only and not controlling of the limits of this invention. Changes may be made in the combination and amounts of components specifically described without departing from the spirit and scope of the invention as set forth in the following claims.

I claim:

1. A well working composition comprising a petroleum oil, having an A. P. I. gravity of less than 29° and .5 to 2 pounds asbestos per barrel of oil wherein about 75 percent of the asbestos has a fiber length less than 2 microns suspended in the petroleum oil for controlling the fluid loss properties and viscosity of the composition, said well working composition being characterized by having an A. P. I. fluid loss less than 10 cc. per 30 minutes.

2. A well working composition as defined in claim 1 characterized further in that the petroleum oil has an A. P. I. gravity less than 25 degrees.

3. A well working composition comprising a petroleum oil having an A. P. I. gravity of less than 29° and .5 to 2 pounds finely ground asbestos per barrel of oil suspended in the petroleum oil for controlling the viscosity and fluid loss properties of the composition, wherein about 40 percent of said asbestos consists of fibers less than 0.5 micron in length.

4. A drilling mud consisting essentially of petroleum oil having an A. P. I. gravity of less than 29° with .5 to 2 pounds finely ground asbestos wherein about 75 percent of said asbestos consists of fibers less than 2 microns in length and weighting materials suspended in the petroleum oil, said mud being characterized by having an A. P. I. fluid loss less than 10 cc. per 30 minutes.

5. A drilling mud as defined in claim 4 characterized further in that about 40 percent of the asbestos has fibers less than 0.5 micron in length.

6. A drilling mud as defined in claim 4 characterized further in that the petroleum oil has an A. P. I. gravity less than 25 degrees.

7. A well working composition consisting essentially of petroleum oil having an A. P. I. gravity of less than 29° with .5 to 2 pounds asbestos per barrel of oil wherein at least 75 percent of the asbestos has a fiber length less than 2 microns and weighting materials suspended in the petroleum oil.

References Cited in the file of this patent
UNITED STATES PATENTS

| | | |
|---|---|---|
| 2,214,366 | Freeland | Sept. 10, 1940 |
| 2,610,149 | Van Dyke | Sept. 9, 1952 |

OTHER REFERENCES

Alexander: Oil Base Drilling Fluids Often Boost Production. Article in The Oil Weekly, September 4, 1944, pages 36, 38 and 40.